GENERAL PURPOSE LOGIC PACKAGE
Filed June 11, 1968
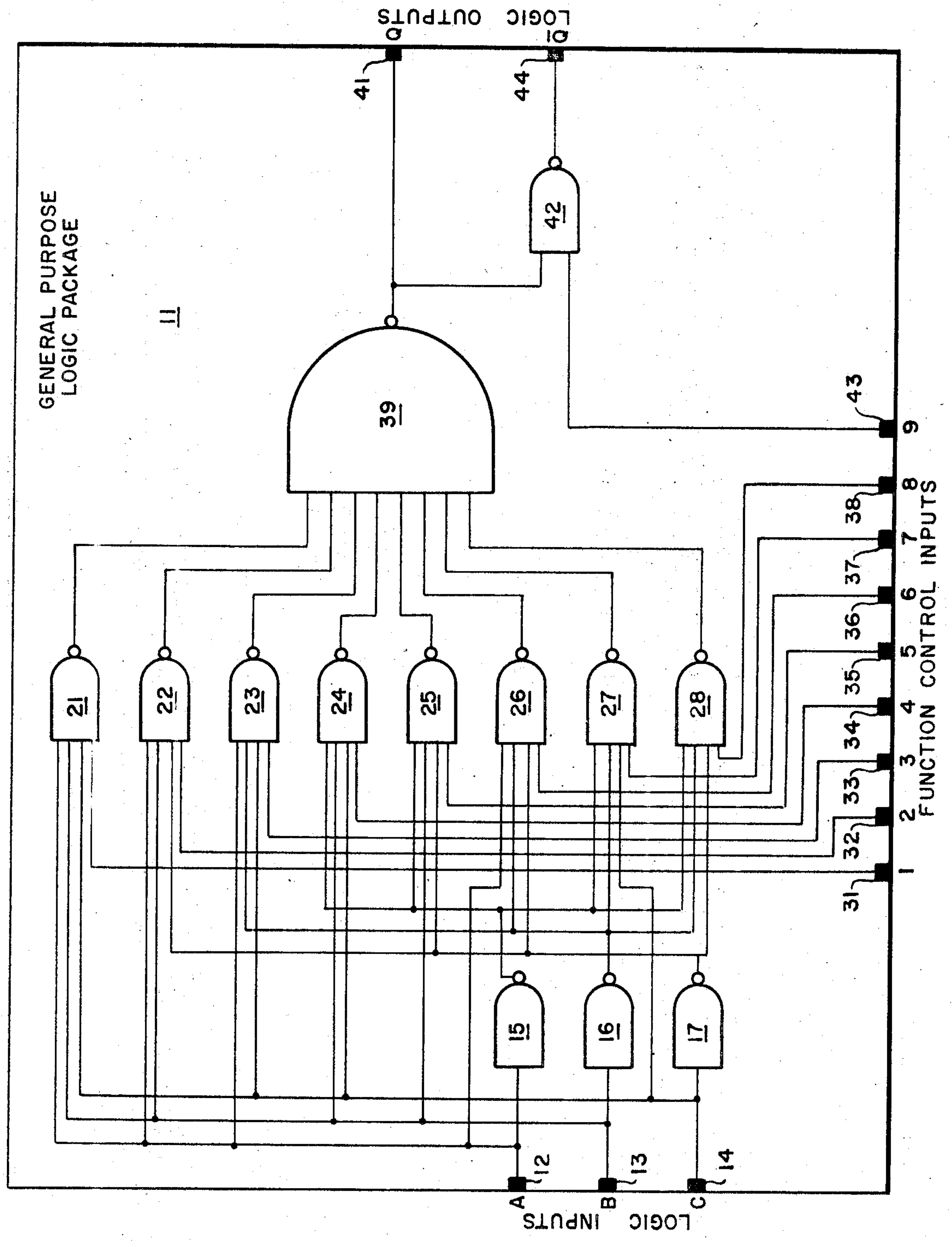
INVENTOR
BYRL DALE TAGUE
BY H. H. Losche
ATTORNEY United States Patent Office 3,538,443

Patented Nov. 3, 1970

3,538,443

GENERAL PURPOSE LOGIC PACKAGE

Byrl D. Tague, Indianapolis, Ind., assignor to the United States of America as represented by the Secretary of the Navy Filed June 11, 1968, Ser. No. 736,211
Int. Cl. H03k 19/00, 19/36
U.S. Cl. 328—92 3 Claims

ABSTRACT OF THE DISCLOSURE

A composite logic module providing a general purpose logic building block for digital computer circuitry entirely comprised of a plurality of internally committed NAND logic gating circuits.

BACKGROUND OF THE INVENTION

This invention is in the field of digital computing logic systems, and more specifically in the area of logic packages or modules for use as general purpose logic building blocks in the construction of modular electronic digital circuitry.

In the past, construction of electronic digital logic systems has often required the use of a great many individually different or unique logic circuits or modules. When unique modules are employed the design may be efficient in number of logic functions performed by each module, but a new design is required for each different application. Also, there is no interchangeability among the various unique modules in the same or associated systems. The limited number of each type of module utilized results in relatively high cost per module and difficulty in maintenance of such a system because of the large number of unique modules which must be stocked in order to have replacements available for repair by substitution, if a malfunction should occur in the modular system. Alternatively, most of the general purpose logic modules of the past have consisted of a few uncommitted logic gates per module, with each gate having each of its input and output lines coupled to separate external connector pins for connecting any one of the uncommitted gates into a desired logic pattern. However, this type of general purpose module, comprised of uncommitted logic gates, has been found to have relatively limited utility because of the physical limitations produced by the inherently large number of external connector pins required for each module.

The general purpose logic module of the present invention overcomes these disadvantages of the prior art.

SUMMARY OF THE INVENTION

The present invention provides a composite, general purpose logic module comprised entirely of a plurality of internally committed gates of a single basic type, namely AND-NOT or NAND circuits. The committed gates greatly reduce the number of input and output lines which must be coupled to the module external connector pins, thereby reducing the number of external connector pins required for each module. Also, by utilizing a single type of logic gate, the module may be more easily constructed by present state-of-the-art microelectronics techniques, and is more compatible throughout a logic system.

The invention is comprised of a plurality of interconnected NAND (AND-NOT) logic gating circuits. A NAND logic gate may be generally defined as one whose output assumes the 0-state if, and only if, all of its inputs assume the 1-state, or stated another way, its output assumes the 1-state so long as one or more of its inputs assume the 0-state. A gate of this type may have any number of desired inputs from one to ten or more. The number of desired inputs will be determined by the logic function which a particular gate must perform. A one-input NAND gate performs an inverting, or "NOT," function, while such a gate having two or more inputs performs both a logical AND function and an inverting function. Many individual embodiments of gating circuits for performing the AND-NOT or NAND logic function are well known in the art and the specific form of these gates is not considered to be a part of this invention. A typical NAND diode-transistor logic circuit having four inputs is shown and described in Chapter 1, including page 11, FIG. 1.19, of the book entitled The Logic Design of Transistor Digital Computers, by Gerald A. Maley and John Earle (Prentice-Hall, Inc., Englewood Cliffs, N.J., 1963).

The logic building block module of this invention includes a first plurality of input terminals or connector pins for receiving $n$ logic input parameters or variables, where $n$ represents the selected number of logic input parameters (A, B . . .) to be utilized by the module. A plurality of single input NAND logic gates equal to the number of $n$ input logic parameters selected, are provided. The single input of each one of these $n$ gates is coupled to a corresponding logic input connector pin. These single-input NAND logic gates provide at their outputs the inverted, or "NOT," function for each of the logic input parameters. A second group of NAND logic gates equal in number to $2^n$, and each having $n+1$ inputs are provided for producing all of the possible canonical terms for the $n$ logic input variables. Each of this second group of gates has $n$ logic inputs, and each gate has these logic inputs coupled to the module logic input connector pins and/or the outputs of the single-input logic gates in such manner that the combination of the $n$ inputs to each gate of this second group of gates will be representative of a single unique logic term comprised of a combination of the $n$ logic input variables and/or their complements. Each of this second group of gates also includes one function control input which is coupled to a separate one of a plurality of module function control input terminals or connector pins. These function control inputs to each of the gates of this second group permit external control of the selection of the logic function or functions to be performed at any particular time within the logic module comprised of internally committed (or coupled) gates.

The output of each of the gates of this second group is coupled as an input to a single NAND gate, whose total inputs are equal in number, therefore, to the number of gates in the second group ($2^n$). The output of this single gate is coupled directly to an output terminal or connector pin of the module, and also as an input to a two-input NAND gate, which has its other input coupled to a function control input terminal or connector pin. The output of this two-input gate is coupled to a second module output terminal or connector pin for providing thereat the inverted, or "NOT," form of the output signal from the single gate, in response to an external selection signal on its function control input pin.

BRIEF DESCRIPTION OF THE DRAWING

The objects and the attendant advantages, features, and uses of the invention will become apparent from the following detailed description when considered in conjunction with the accompanying drawing which depicts a block diagram of one embodiment of the general purpose logic module comprising the invention.

DESCRIPTION OF THE PREFERRED EMBODIMENT

Referring more particularly to the figure of drawing, there is shown a logic block diagram of an embodiment of the invention in which $n$, the number of logic input parameters or variables, has been selected to be three.

These three logic input variables are represented by the letters A, B and C. The general purpose logic package or module 11 includes input terminals or connector pins 12, 13 and 14 for receiving the binary logic input variable A, B and C, respectively. The three single-input NAND gates 15, 16 and 17 have their inputs coupled to logic connector pins 12, 13 and 14 for receiving the logic input variables A, B and C, respectively. Gates 15, 16 and 17 provide at their respective output terminals the inverted or "NOT" functions ($\bar{A}$, $\bar{B}$, $\bar{C}$) of the input variables A, B and C. The eight ($2^n=8$, for $n=3$ variables) NAND gates 21 through 28, each have four inputs ($n+1=4$, for $n=3$ variables). Three of these inputs per gate are logic inputs and are coupled to some combination of connector pins 12, 13, 14 and/or the outputs of gates 15, 16 and 17 in such manner that each of the eight gates will produce a different one of the eight possible canonical terms of the three logic variables A, B and C. The remaining input for each gate is coupled to a respective one of eight function control input terminals or connector pins 31 through 38. The output of each of the gates 21 through 28 is coupled to a respective one of the inputs of an eight-input NAND gate 39. The output of gate 39 is coupled directly to an output terminal or connector pin 41. The logic output signal at terminal 41 is represented by the letter Q. The output of gate 39 is also coupled as a logic input to a two-input NAND logic gate 42, which has its other input coupled to a function control input terminal 43. The output of gate 42 is coupled directly to a second output terminal or connector pin 44. The logic output signal present at terminal 44, when a selection signal is present on function control input 9 at terminal 43, is the inverted or "NOT" form of the output signal Q present at terminal 41, and is represented by the symbol $\bar{Q}$, or NOT Q.

As may be seen by careful observation of the figure of drawing, the logic inputs to the gates 21 through 28 are as shown in the following Table I.

TABLE I

| GATE: | Logic inputs |
|---|---|
| Gate **21** | A, B, C |
| Gate **22** | A, B, $\bar{C}$ |
| Gate **23** | A, $\bar{B}$, C |
| Gate **24** | $\bar{A}$, B, C |
| Gate **25** | $\bar{A}$, B, $\bar{C}$ |
| Gate **26** | A, $\bar{B}$, $\bar{C}$ |
| Gate **27** | $\bar{A}$, $\bar{B}$, C |
| Gate **28** | $\bar{A}$, $\bar{B}$, $\bar{C}$ |

For the three binary logic input variables A, B and C, the eight logic input combinations shown in Table I comprise all of the possible canonical terms which may be produced from these three variables. Thus it will be understood by those skilled in the art that the embodiment of the invention shown in the figure of drawing utilizing these three binary, or two level, logic variables A, B and C is capable of performing any and all of the logic functions represented by the following Equation 1:

$$Q=ABC1+AB\bar{C}2+A\bar{B}C3+\bar{A}BC4+\bar{A}B\bar{C}5+A\bar{B}\bar{C}6+\bar{A}\bar{B}C7+\bar{A}\bar{B}\bar{C}8 \quad \text{(Equation 1)}$$

in which the numbers 1 through 8 represent function control selection signals applied to function control input terminals 31 through 38, respectively. The function Q will be available as the output at terminal 41, and in its inverted, or $\bar{Q}$, form at terminal 44 so long as a function control selection signal is present at function control input terminal 43. The function control selection signals applied to one or more of the function control input terminals 31 through 38 provide versatility for the invention by permitting external control of the selection of the logic function or functions to be performed at any particular time by module 11 which is entirely comprised of internally commited NAND gates.

OPERATION

As will be understood by those skilled in the art, this invention is a general purpose logic package or module for use as a building block in the construction of binary logic systems and digital computer circuitry, and is not intended to represent a complete logic system or subsystem. Therefore, in order to explain the operation of the embodiment of the invention shown in the figure of drawing, it will be necessary to assume various conditions for the logic input variables A, B and C, and the function control selection signals 1 through 9.

Referring now to the figure of drawing, it will be assumed that binary signal levels representative of the condition of logic input variables A, B and C, i.e., 1-state for A or 0-state for $\bar{A}$, et cetera, are applied to logic input terminals 12, 13 and 14, respectively. With these logic variables applied to input terminals 12, 13 and 14, the invention is prepared to perform any combination of the logic functions represented by Equation 1. For example, if it is desired for module 11 to perform the function represented by the following Equation 2:

$$Q=AB\bar{C}+\bar{A}BC+\bar{A}\bar{B}C \quad \text{(Equation 2)}$$

this may be accomplished by simultaneously applying a function control selection signal (1-state) to each of the function control input terminals 32, 34 and 37. These selection signals then appear as enabling or selection inputs to NAND gates 22, 24 and 27 whose logic inputs are comprised of (A, B, $\bar{C}$), ($\bar{A}$, B, C,), and ($\bar{A}$, $\bar{B}$, C) respectively, as may be seen by careful observation of the figure of drawing and as set forth in Table I. The function Q for Equation 2 will then be present at terminal 41. If the inverted or $\bar{Q}$ form of the function is desired, a selection signal should also be applied to function control input terminal 43, which will enable NAND gate 42 to provide this inverted function at module output terminal 44. In a like manner, module 11 is capable of performing all or any combination of the functions represented by Equation 1 upon application of a selection signal to the appropriate one or more of the function control input terminals 31 through 38.

Thus it may be seen in view of the foregoing explanation and figure of drawing that the invention, a general purpose logic package comprised of a plurality of internally committed NAND logic gating means and having a minimum number of external terminals or connector pins, is a versatile device having considerable utility as a building block for the construction of logic and digital computer systems.

While many modifications and changes may be made, such as employing many different forms of NAND logic gating means and methods of constructing them, such as discrete components mounted on printed wiring boards or by microelectronics techniques employing thick or thin film technology, or by varying the number of gating means to accommodate a larger or smaller number of logic input variables for a particular application, it is to be understood that I desire to be limited in the spirit of my invention only by the scope of the appended claims.

The invention described herein may be manufactured and used by or for the Government of the United States of America for governmental purposes without the payment of any royalties thereon or therefor.

I claim:

1. A general purpose logic module for use as a building block in logic and digital computer systems comprising:

a first plurality of $n$ input terminals, where $n$ represents the preselected number of binary logic input variables to be utilized by said logic module, each of said first plurality of input terminals for receiving signals indicative of a different one of said binary logic input variables;

a plurality of $n$ single-input NAND logic gating means, each of said single-input logic gating means having its input coupled to a respective one of said first plurality of $n$ input terminals for receiving said signals indicative of a different one of said binary logic input variables, each of said single-input NAND logic gating means providing at its output the inverted form of said signals received at its said input;

a plurality of $2^n$ NAND logic gating means, each having $n$ logic inputs, one function control input, and an output, said logic inputs being coupled to said first plurality of $n$ input terminals and to said outputs of said single-input NAND logic gating means in such manner that said $n$ logic inputs to each said logic gating means will provide a unique one of the possible $2^n$ canonical terms of said $n$ binary logic input variables;

a second plurality of input terminals, one each being coupled to said function control input of a respective one of said plurality of $2^n$ NAND logic gating means for providing function control selection signals thereto for enabling external control of the logic functions to be performed by said general purpose logic module;

a $2^n$-input NAND logic gating means having a single output, and having one each of its inputs coupled to said output of a respective one of said plurality of $2^n$ NAND logic gating means; and a first output terminal coupled to said output of said $2^n$-input NAND logic gating means, for providing thereat signals representative of the logic functions produced by said general purpose logic module.

2. A general purpose logic module for use as a building block in logic and digital computer systems as set forth in claim 1, which further comprises:

a second output terminal; and logic inverting means coupled between said output of said $2^n$-input NAND logic gating means and said second output terminal, for providing at said second output terminal signals representative of the inverted form of the logic functions produced by said general purpose logic module.

3. A general purpose logic module for use as a building block in logic and digital computer systems as set forth in claim 2 wherein:

said logic inverting means is comprised of a two-input NAND logic gating means having its output coupled to said second output terminal, having one of its inputs coupled to said output of said $2^n$-input NAND logic gating means, and having its other input coupled to an input terminal for receiving a function control selection signal.

References Cited

UNITED STATES PATENTS 3,428,903 2/1969 Forslund et al. -------- 328—92

JOHN S. HEYMAN, Primary Examiner

J. ZAZWORSKY, Assistant Examiner

U.S. Cl. X.R.

307—203, 215; 328—93

PO-1050
(5/69)

UNITED STATES PATENT OFFICE
CERTIFICATE OF CORRECTION
UNDER RULE 322

Patent No. 3,538,443 Dated November 3, 1970

Inventor(s) B. D. Taque

It is certified that error appears in the above-identified patent and that said Letters Patent are hereby corrected as shown below:

Column 4, Equation 2, that portion of the Equation reading $A\bar{B}\bar{C} + \bar{A}BC$ should read $AB\bar{C} + \bar{A}BC$ Signed and sealed this 3rd day of August 1971.

(SEAL)
Attest:

EDWARD M.FLETCHER,JR.
Attesting Officer

WILLIAM E. SCHUYLER, JR.
Commissioner of Patents